US005725816A

United States Patent [19]

Sagawa et al.

[11] Patent Number: 5,725,816

[45] Date of Patent: Mar. 10, 1998

[54] PACKING METHOD

[75] Inventors: Masato Sagawa; Hiroshi Nagata, both of Kyoto; Toshihiro Watanabe, Muko; Terumasa Miyoshi, Kiyose; Mizuho Kasahara, Koganei, all of Japan

[73] Assignee: Intermetallics Co., Ltd., Kyoto, Japan

[21] Appl. No.: 712,543

[22] Filed: Sep. 11, 1996

[30] Foreign Application Priority Data

| | | | |
|---|---|---|---|
| Sep. 11, 1995 | [JP] | Japan | 7-258120 |
| Dec. 15, 1995 | [JP] | Japan | 7-347609 |

[51] Int. Cl.$^6$ ..... B29C 43/14

[52] U.S. Cl. ..... 264/102; 264/120; 419/66

[58] Field of Search ..... 264/571, 517, 264/102, 120, 500; 419/66

[56] References Cited

U.S. PATENT DOCUMENTS

| | | | |
|---|---|---|---|
| 4,788,023 | 11/1988 | Buhler et al. | 264/517 |
| 4,937,025 | 6/1990 | Foster et al. | 264/120 |
| 5,122,319 | 6/1992 | Watanabe et al. | 264/109 |
| 5,215,697 | 6/1993 | Toki et al. | 264/121 |
| 5,455,002 | 10/1995 | Kobayashi et al. | 419/66 |

*Primary Examiner*—Mary Lynn Theisen
*Attorney, Agent, or Firm*—Morrison & Foerster LLP

[57] ABSTRACT

The present invention relates to a packing method in which a material (p) is fed into a space comprising an opening (4*c*) for feeding the material and a space (4*d*) to be packed with said material, and said space is subjected to air tapping, that is, switching of air-pressure from a low air-pressure state to a high air-pressure state alternately, thereby packing the material into the space (4*d*) at a high packing-density. The use of air tapping for packing a material into a space makes the packing-density of the material uniform.

21 Claims, 11 Drawing Sheets

13b
13a
12a
12
11
10
9
13
p
8
15
14c
14a
14b
14

PACKING METHOD

FIELD OF THE INVENTION

The present invention relates to a packing method in which a powder, a granular material, a material in flakes, a plate material or the like is injected into a container or receptacle such as a can, a bag, a rubber mold, a die or the like which has an opening for feeding the material and a space of which is filled with said powder or the like.

PRIOR ART

A packing method has been known in which a space with an opening for injecting a material is filled with the material, and the material is pressed with a pressing device such as pusher or the like, thereby packing the space with the material more compacted.

Another packing method has also been known in which the injected material is mechanically vibrated or tapped, thereby filling the space with the material more compacted.

PROBLEMS TO BE SOLVED BY THE INVENTION

In the conventional methods described above, because the material is pressed with a pressing device like a pusher, or vibrated and tapped mechanically, the material tends to be damaged when it is weak to mechanical shocks.

Another problem of the conventional methods is that applying mechanical vibration or tapping to the die or the container, to the device to hold them, or to the apparatus, or to the table for conveying the die or the container causes to damage those devices and shorten their durable years.

In addition, pressing the material packed in the space leads to the difference in the packing-density between the region near the pressing device and the region distant from the pressing device, because the material in the region away from the pressing device receives a pressing force weaker than that in the vicinity of the pressing device. Therefore, it cannot ensure a packing with a uniform packing-density. This is especially a problem when packing the material into a long and narrow space. If a rubber mold is filled with a powder as the material with uneven packing densities and pressed as it is with punches or by hydrostatic pressing, the resultant compact is likely to have distortion in shape or to crack or to chip. Furthermore, an unevenly filled container can contain only an insufficient, small quantity of the material, which means that the space of the container is not fully used. In spite of many demands in the industry for uniform and highly densified packing, it has been difficult for the conventional packing methods to satisfy those demands.

It is an object of the invention to solve the problems mentioned above, as well as to provide a packing method by which a material can be efficiently and quickly packed into a space.

DETAILED DESCRIPTION OF THE PREFERRED EMBODIMENT

Using FIGS. 1 to 11, embodiments of the present invention will be described but the present invention is not limited to these embodiments but may be otherwise modified within the scope of the invention.

Figure 1:
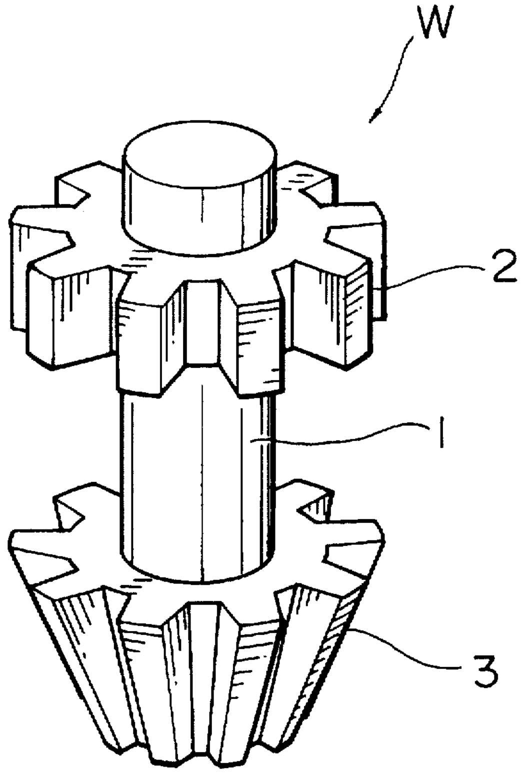
FIG. 1 is a perspective view of a part produced by subjecting a compact after pressing to a process such as sintering.

First of all, using FIGS. 1 and 2, an embodiment of the present invention is explained in which a powder to be compacted is packed into a space formed as a split die.

A part (w) shown in FIG. 1 forms an integrated body comprising a spur gear (2) which is formed around the middle of axis (1) and a bevel gear (3) formed at the end of axis (1). The method for producing a green compact for the part (w) by using a split die is hereinafter described.

A split die (4) is assembled with two parts (4*a*),(4*b*) by bringing each vertical surface into contact, and the assembled split die (4) is provided with an opening (4*c*) on its top. A space part (4*d*) which is filled with powder (p) is designed intending for the part (w) taking the dimensional change after sintering into account. A guide (5) is placed upon the split die (4). The diameter of the hole (5*a*) of the guide (5) is the same as or smaller than the diameter of the opening (4*c*) of the split die (4). In order to facilitate to supply the powder (p) into the hole (5*a*) of the guide (5), the upper end of the hole (5*a*) should preferably form a slope as indicated by (5*b*).

Figures 2A, 2B, 2C, 2D:
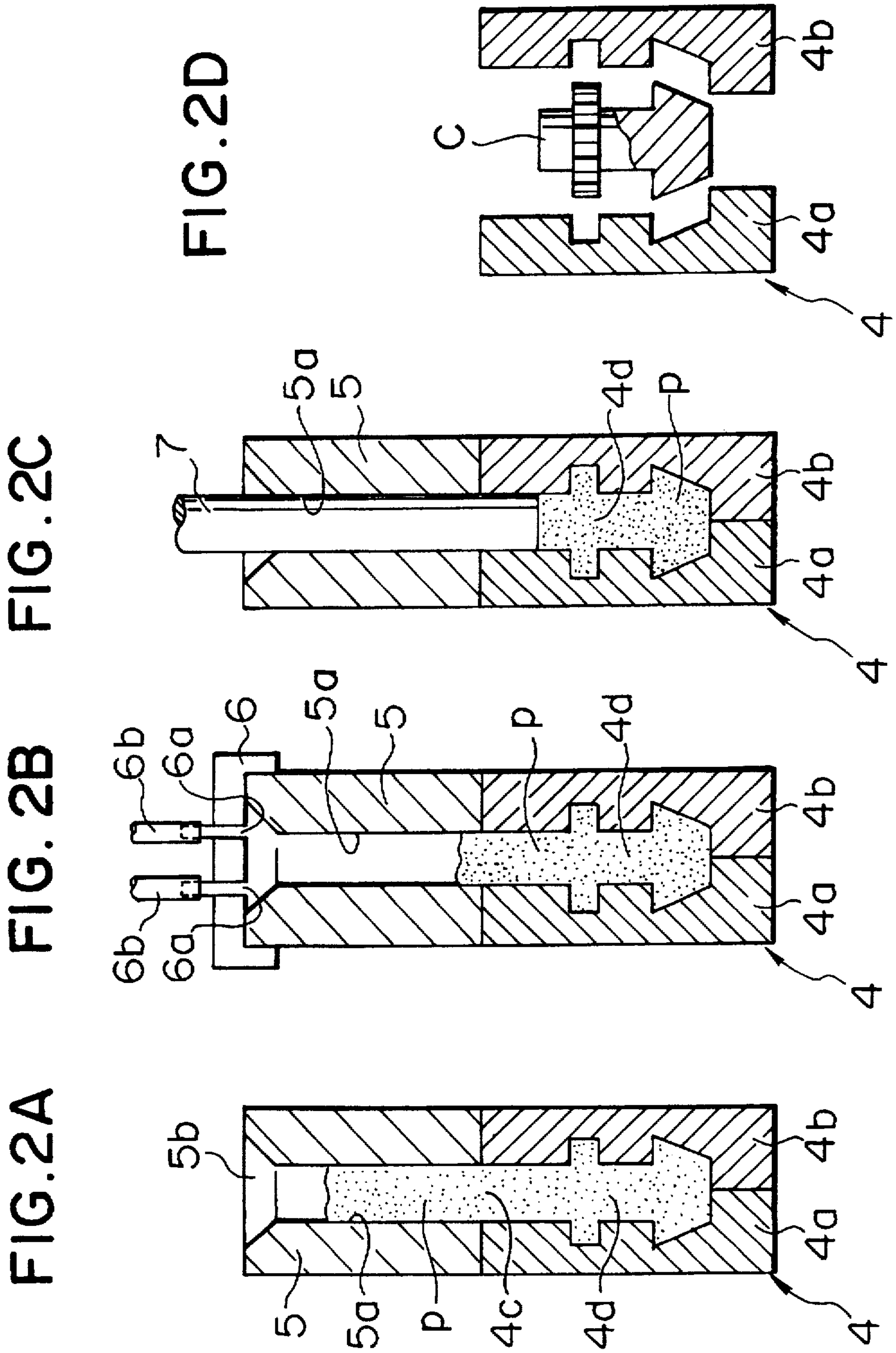
FIGS. 2A, 2B, and 2C are a vertical sectional view of a split die and a guide etc. for producing a compact in which the packing method of the present invention is adopted.

As shown in FIG. 2A, after the guide (5) is placed upon the split die (4), a preliminarily weighed powder (p) is supplied into the space part (4*d*) of the split die (4) and the hole (5*a*) of the guide (5) to a desired depth.

Then, as shown in FIG. 2B, the cover element (6) is placed upon the guide(5) so that it seals the guide (5). The cover element (6) is provided with an appropriate number of holes (6*a*) which are connected with connecting pipes (6*b*). The connecting pipes (6*b*) are connected with a pumping device such as an ejector-type vacuum generator which is not shown in the drawing. After the guide (5) is covered with the cover element (6), the pumping device is actuated to let air out of the space part (4*d*) of the split die (4) and the hole (5*a*) of the guide (5) so that the space comprising the space part (4*d*) of the split die (4) and the hole (5*a*) of the guide (5) is brought into a low air-pressure state. By bringing these the space part (4*d*) and the hole (5*a*) into the low air-pressure state, the air contained in powder (p) is ejected.

Subsequently, after a desired time of the deaeration, the air-pressure flowing into the pumping device such as the ejector-type vacuum generator is cut, and air is introduced through the hole (6*a*) of the cover element (6) so that the air-pressure in the space comprising the hole (5*a*) of the guide (5) and the space part (4*d*) of the split die (4) becomes high. As a result, the filling density of powder (p) which fills the space comprising the space part (4*d*) of split die (4) and hole (5*a*) of the guide (5) is raised.

As discussed above, by switching the air-pressure of the space comprising the space part (4*d*) of the split die 4 and the hole (5*a*) of the guide (5) from a low air-pressure state to a high air-pressure state appropriate times, the air contained in the powder (p) is evacuated as well as most of the powder (p) in the hole (5*a*) of the guide (5) is packed into the space part (4*d*) of the split die (4). The repetition of switching the state of the space from the low air-pressure to the high air-pressure is hereinafter simply refferred to as the "air tapping process" or "air tapping". Such an air tapping process ensures the high-density packing of the powder (p) into the space part (4*d*) of the split die (4).

For the air tapping process described above, not only air but also various kinds of gases can be used. For example, when the powder to be used is susceptible to oxdation or explosive, nitrogen gas or argon gas or the like is used.

The low air-pressure state and the high air-pressure state in the air tapping process mentioned above mean the states of the air-pressure relatively low or high when compared to each other. The packing-density of powder (p) is increased when the state is switched from the low air-pressure to the high air-pressure. Typically, the low air-pressure is in the range of 0.1 to 0.5 atm and the high air-pressure is in the range of 0.6 to 1.0 atm.

Defining one cycle of the air tapping process as the time consumed in the period starting from the high air-pressure state followed by the low air-pressure state, and ending in the high air-pressure state, a typical cycle time is in the range of 0.1 to 1 second, and the packing can be completed within 5 to 10 cycles. Using the ejector-type vacuum generator mentioned above makes it easy to carry out the air tapping in such a short cycle time. That is, supplying air-pressure into the ejector-type vacuum generator creates the low air-pressure state, and cutting the air supply immediately creates the high air-pressure state, because the previously ejected air flows back into the space when the air supply is cut. The air tapping is carried out in a cycle time described above by supplying air-pressure intermittently (by valve operation). The cycle time may of course be longer or shorter, as well as the cycles may be repeated more or less times, considering the size and the shape of the space or the flowabillity of the material.

By rapidly carrying out the repetition of the switching from the low air-pressure state to the high air-pressure state, the space part (4*d*) of the split die (4) can be efficiently filled with powder (p) in more quantity and with high packing-density. The speed of air flow when introducing air into the space comprising the hole (5*a*) of the guide (5) and the space part (4*d*) of the split die (4) should be higher than when reducing pressure of the said space to bring it into the low air-pressure state so that the high-density packing of powder (p) can be more efficiently carried out.

After the air tapping process as above is finished, as shown in FIG. 2C, a punch (7) which functions as a pusher is inserted into the hole (5*a*) of the guide (5), thereby further densifying the powder (p).

A compact (C) produced through the aforementioned processes is removed from the split die (4) by removing the guide (5), the cover element (6) and the punch (7) as well as by separating the split die (4) into two parts (4*a*), (4*b*). Then the compact (C) is subjected to sintering or the like, thereby obtaining the part (W).

In the conventional method, a certain amount of the powder (p) as shown in FIG. 2A is injected into the space part (4*d*) of the split die (4) and the hole (5*a*) of the guide (5) to a desired depth, then the punch (7) is inserted into the hole (5*a*) so as to fill the space part (4*d*) of the split die (4) with the powder (p). In this case, the pressing force of the punch (7) does not reach the lower part of the powder (p) and concentrates to the powder (p) in the vicinity of punch (7), raising the packing-density partially in the vicinity of the punch (7). Therefore, the resultant compact(C) is not uniform in terms of packing-density. In the present invention, because the whole or almost all of powder (p) in the hole (5*a*) of the guide (5) is packed into the space part (4*d*) of the split die (4), the punch (7) needs to descend only a small distance, and therefore, there is little difference in packing-density between the powder (p) in the vicinity of the punch (7) and the powder (p) of the lower region, which results in a compact (C) having a uniform packing-denisy.

If the powder is pressed only with the punch (7), the powder can not be packed into the space part shaped as the spur gear (2) and bevel gear (3) in FIG. 1, because the powder is only pressed downward not sidewards. With such an uneven packing condition, the packing-density of powder cannot be high enough to have a requierd strength as the compact. Therefore, it has been very difficult for a powder metallurgic method to produce parts having shapes of the compacts in FIG. 1.

The present invention allows the powder (p) to thoroughly fill the space part (4*d*) of the split die (4) including its corners by the air tapping, and therefore prevents from producing defective compacts. The present invention is very effective as a method to fill a space projecting sideward as shown in FIG. 2.

Referring to FIG. 3, an embodiment of the present invention for producing a thin, tall cylindrical compact is now described.

(8) is a die having a columnar space and (9) is a columnar core placed in the center of the columnar space of the die (8) whose upper end is slightly projected from the upper surface of the die (8). (10) is a lower punch inserted into the lower part of the cylindrical space (11) which is formed between the inner peripheral surface of the die (8) and the outer peripheral surface of the columnar core (9). The inner peripheral surface of the die (8), the outer peripheral surface of the colunmar core (9) and the lower punch (10) inserted into the lower part of the cylindrical space (11) form a space part (12) having an annular opening (12*a*). (13) is a guide placed on the upper surface of the die (8). The hole (13*a*) of the guide (13) is designed to have a diameter almost same as the diameter of the columnar space of the die (8). The upper part of the hole (13*a*) of the guide (13) should preferably be formed to have an extended, sloped part (13*b*) so as to facilitate injection of the powder (p).

(14) is a cover element to cover and to seal the guide (13). Into a hole (14*a*) provided in the central part of the cover element (14), a cylindrical upper punch (15) to be inserted into the above mentioned cylindrical space (11) is fit through a sealing device such as an O-ring (not shown in the drawing) in a vertically slidable manner. The cover element (14) is provided with an appropriate number of holes (14*b*) to which connecting pipes (14*c*) are connected. The connecting pipes (14*c*) are connected with a pumping device such as an ejector-type vacuum generator (not shown in the drawing).

Figures 3A, 3B, 3C:
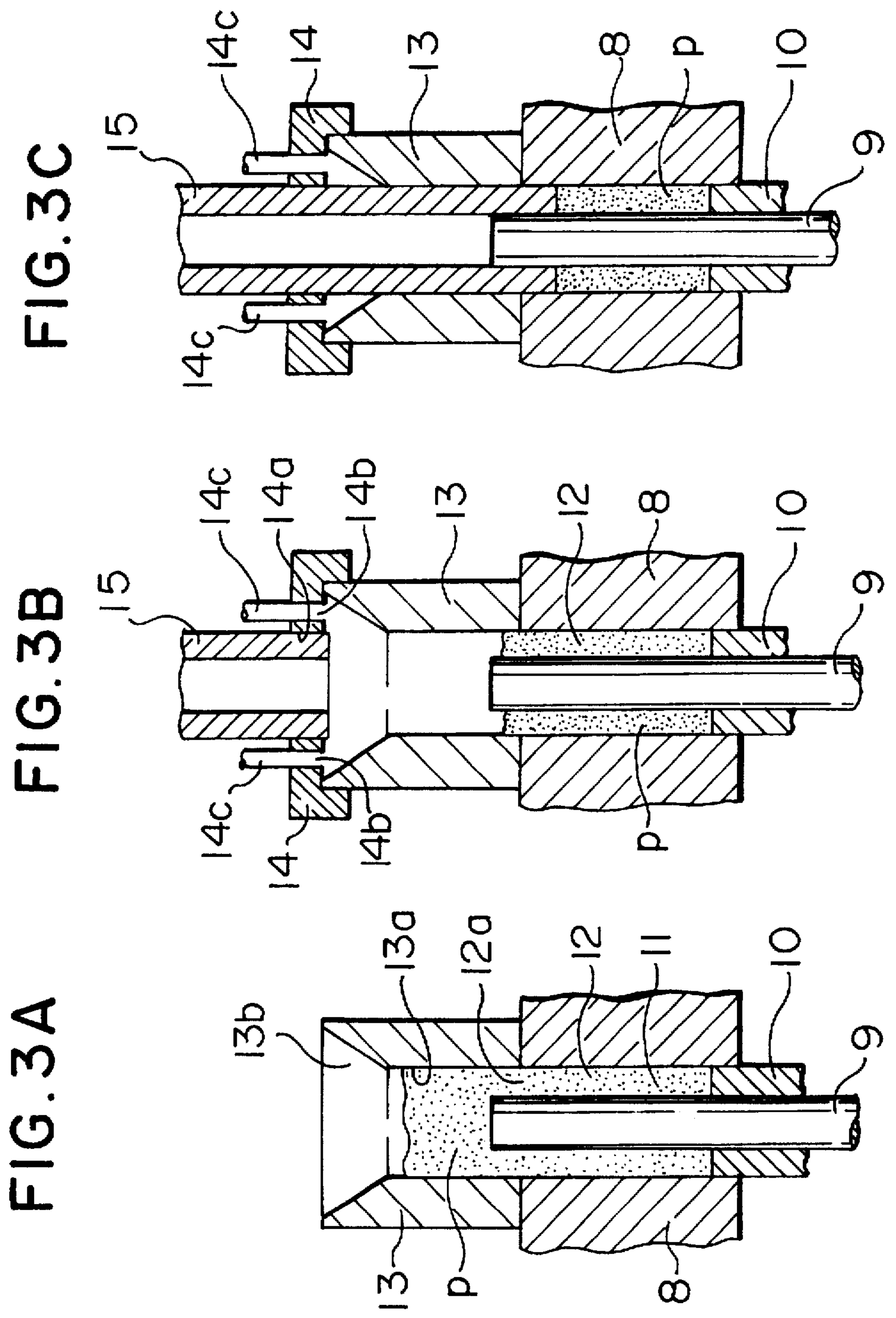
FIGS. 3A, 3B and 3C are a vertical sectional view of a die and a guide etc. for producing a cylindrical compact in which the packing method of the present invention is adopted.

As shown in FIG. 3A, after the guide (13) is placed upon the upper surface of the die (8), the powder (p) is injected into the space part (12) and the hole (13*a*) of the guide (13) to a desired depth from a powder feeding device (not shown in the drawing).

Subsequently, the guide (13) is covered and sealed with the cover element (14). Then the pumping device is actuated to switch the state of a space comprising the space part (12) and the hole (13*a*) of the guide (13) from the low air-pressure to the high air-pressure alternately. By carrying out such air tapping, most of the powder (p) injected into the hole (13*a*) of the guide (13) is packed into the space part (12). The upper punch (15) is not moved during the air tapping process.

The top of the upper punch (15) is sealed so as to prevent air from going out of the space. Also, the clearances between the die (8) and the lower punch (10) and between the core (9) and the lower punch (10) are sealed with a rubber packing or the like for the same purpose. It is necessary for the clearances to be small enough so that it does not prevent the making of the required low air-pressure and high air-pressure states even if air leaks from the clearance.

After completion of the air tapping process, as FIG. 3C shows, the upper punch (15) as a pusher is inserted into the hole (13*a*) of the guide (13), and the upper punch (15) is further inserted into the cylindrical space part (12) formed between the inner peripheral surface of die (8) and the outer peripheral surface of the core (9), thereby packing all the powder (p) remaining in the hole (13*a*) of the guide (13) into the space part (12), as well as pressing with the lower punch (10) and the upper punch (15) to produce a powder compact.

After the pressing, the upper punch (15) and the cover element (14) are removed and when necessary, the guide (13) is removed from the top of the die (8), and subsequently, the lower punch (10) is moved upward to take the produced compact out of the die (8).

When producing a long and thin cylindrical compact by using the conventional die pressing method, the powder (p) is packed into the deep, cylindrical space part (12) formed by the core (9) and the die (8) and the like, and then pressed with the lower punch (10) and the upper punch (15). Most of powders are hardly packed into such a long and thin space part (12) but likely to form bridges, and therefore the depth of the space part (12) should often be about three times as deep as the end compact. Injecting a powder into such a deep space part (12) is very difficult. In addition, moving the upper punch (15) and lower punch (10) for such a long distance-causes the powder to get caught by clearances, which reduces the productivity of the compact and damages the die etc..

In the present invention, as FIG. 3 shows, the powder (p) is packed at a high packing-density prior to the compaction with the upper punch (15) and lower punch (10), therefore the lower and upper punches (10), (15) need to move only a small distance. Accordingly, it does not cause the powder (p) to get caught by clearances and can improve the productivity of the compact and the life of the die etc..

Futhermore, in the conventional die pressing method, the pressing force of lower and upper punches (10),(15) does not reach the powder (p) existing in a region distant from the lower and upper punches (10),(15), but concentrates to the powder (p) in the vicinity of the lower and upper punches (10),(15), which results in a partial increase of the packing-density of the powder (p) only in the vicinity of the lower and upper punches (10),(15), leading to a compact with variant packing-densities.

The present invention affords the whole or almost all of the powder (p) injected in the hole (13*a*) of the guide (13) to fill the space part (12), only requiring the upper punch (15) and the lower punch (10) to move a small distance. Therefore, the difference in packing-density between in the vicinity of the lower and upper punches (10),(15) and in the region distant from the lower and upper punches (10),(15) is small, and thus the resultant compact has a uniform packing-density.

One of the great advantages of the packing method of the present invention is that the powder preliminarily weighed pricisely and injected into the die can be fully used without remain to produce a powder compact. The resultant compacts are therefore hafe no variance in quality.

Referring to FIG. 4, an embodiment of the present invention which is adopted in a dry hydrostatic pressing apparatus is now described.

(16) is a pressure vessel comprising a side wall (16*a*), a top wall (16*b*) and a bottom wall (16*c*), and the top wall (16*b*) and the bottom wall (16*c*) are provided in each central part with holes (16*b*'),(16*c*') respectively. For connecting the holes (16*b*'),(16*c*') and sealing a space of the pressure vessel (16), a tubular pressure medium element (16*d*) made from rubber material (hereinafter referred to as "pressure medium element") is applied. By the side wall (16*a*), the top wall (16*b*), the bottom wall (16*c*) and the pressure medium element (16*d*), the space (16*e*) of the pressure vessel (16) is formed. The side wall (16*a*) is provided with a fluid introducing tubes (16*f*) from which a fluid is injected into the space (16*e*). (17) is a cylindrical rubber mold loaded in the pressure medium element (16*d*) as a pressure medium. A core (18) is provided in the center of the rubber mold (17). The outer peripheral surface of the core (8) and the inner perpheral surface of the rubber mold (17) forms a cylindrical space. Into the lower part of the said cylindrical space, a cylindrical lower punch (19) is inserted. The outer peripheral surface of the core (18), the inner peripheral surface of the rubber mold (17) and the top surface of the lower punch (19) form an space part (20). The top wall (16*b*) comprises an annular element (16") which is placed upon the upper end of the rubber mold (17) after the rubber mold (17) is loaded in the pressure medium element (16*d*). (21) is a guide having a hole (21*a*) and is mounted on the top wall (16*b*) of the pressure vessel (16).

Figures 4A, 4B, 4C:
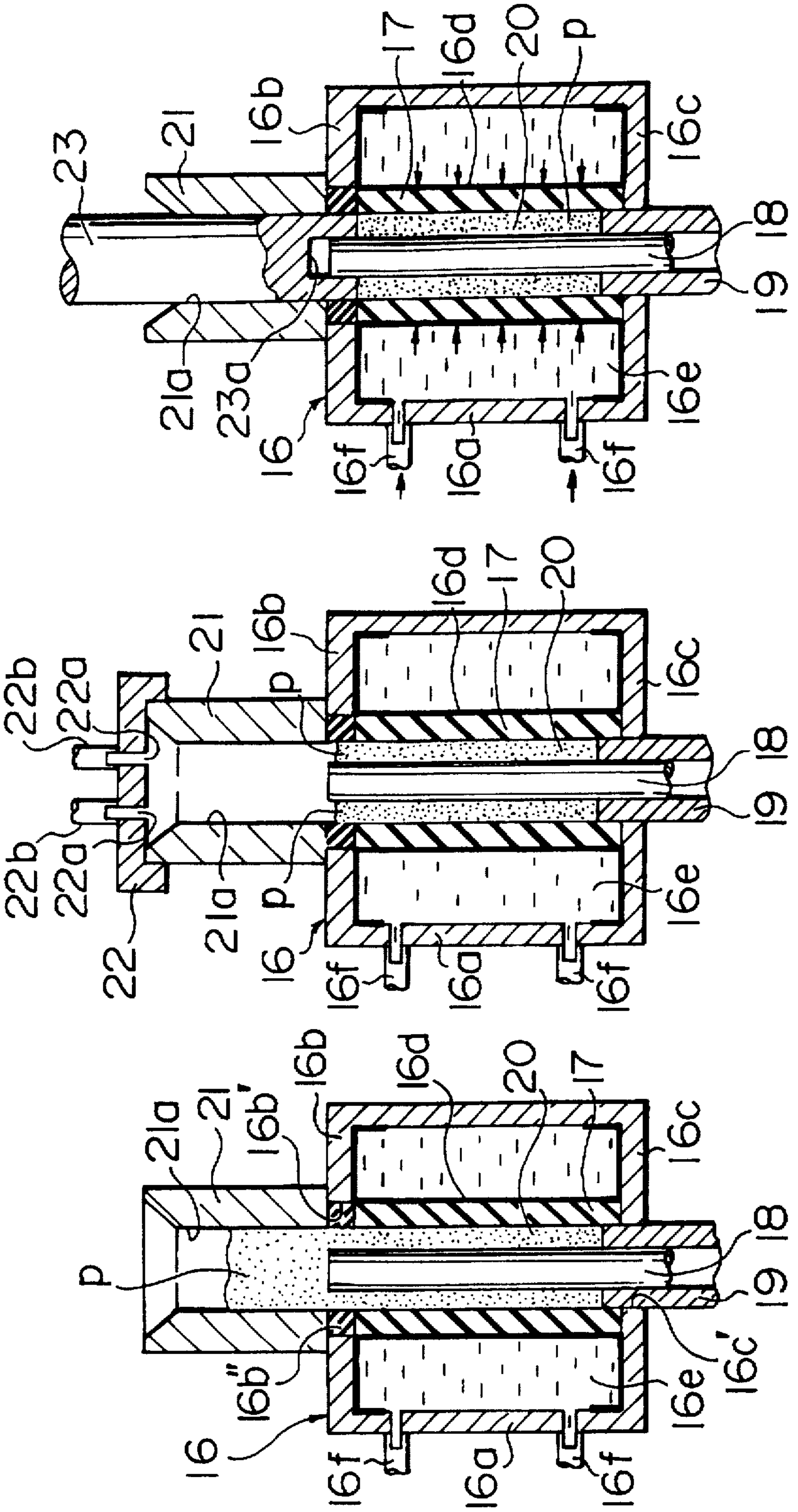
FIGS. 4A, 4B and 4C are a vertical sectional view of a dry hydrostatic pressing apparatus in which the packing method of the present invention is adopted.

As shown in FIG. 4A, a powder feeder (not shown in the drawing) feeds a preliminarily weihghed, appropriate amount of powder (p) into the space part (20) and the hole (21*a*) of the guide (21) to a desired depth. The pressure vessel (16) is filled with a fluid such as oil.

Subsequently, as FIG. 4B shows, the guide (21) is covered with a cover element (22) so as to seal the space comprising the space part (20) and the hole (21*a*) of the guide (21). The cover element (22) is provided with an appropriate number of holes (22*a*) to which connecting pipes (22*b*) are connected. The connecting pipes (22*b*) are connected to the pumping device (not shown in the drawing). After the guide (21) is covered with the cover element (22) so as to seal the space, the sealed space comprising the space part (20) and the hole (21*a*) of the guide (21) is alternately brought into the low air-pressure state and the high air-pressure state. By carrying out such air tapping, the powder (p) injected into the hole (21*a*) of the guide (21) is packed into the space part (20).

Subsequently, the cover element (22) is removed. As FIG. 4C shows, a columnar upper punch (23) is inserted into the hole (21*a*) of the guide (21) so that the surface of the powder (p) packed in the space part (20) is leveled. In the lower end of the upper punch (23), a recess (23*a*) is formed so as to fit to the upper end of the core (18).

The fluid is further injected from the fluid introducing tube (16*f*) into the pressure vessel (16) so that the pressure is applied from outside to the rubber mold (17) to compact the powder (p) in the space part (20). After the compaction of the powder (p) is carried out, the fluid introduction is stopped and the pressure to the rubber mold (17) is released, as well as the upper punch (23) and the guide (21) are removed. Then the cylindrical compact obtained through the above process is ejected by moving the lower punch (19) upward.

Because it used to be extremely difficult to fill a long, thin cylindrical space with the powder to have a uniform packing-density, the powder had to be granulated. However, even if a granulated powder was used, it took a long time to carry out the packing which resulted in low productivity of the compact. In addition, sometimes granulation is unfavorable because of carbon contamination and the like. If a dry hydrostatic pressing as the present embodiment is carried out with the powder unevenly packed, the thickness of the cylindrical compact varies depending on the regions, resulting in distorted shape. By adopting the method of the present invention, homogeneous, rapid packing can be done with a ungranulated powder, and compacts without distortion can be produced efficiently by the dry hydrostatic pressing.

The present applicant proposed a method and apparatus for granulation using a rubber mold in the prior application (Publication of the unexamined Japanese patent application, KOKAI H6-142487). In this application, the granulation is carried out by loading a powder on the surface of a rubber mold provided with many cavities, and then leveling the surface with a spatula so as to fill the cavities of the rubber mold with the powder. However, there was a problem in such a packing method by means of leveling that not all the cavities were filled with powder uniformly.

An embodiment adopting the packing method of the present invention in the granulation of using a rubber mold discussed above is now described referring to FIG. 5.

(24) is a cylindrical die and (25) is a lower punch inserted into the die (24). (26) is a rubber mold provide with many cavities (26*a*) in the upper surface which is loaded in a recess (27) formed by the die (24) and the lower punch (25) inserted therein. (28) is a guide placed on the upper surface of the die (24). In the present embodiment, the cavities (26*a*) with openings themselves form space parts in which the powder (p) is packed. (29) is a backup ring attached to the upper end of the lower punch (25).

Figure 5C:
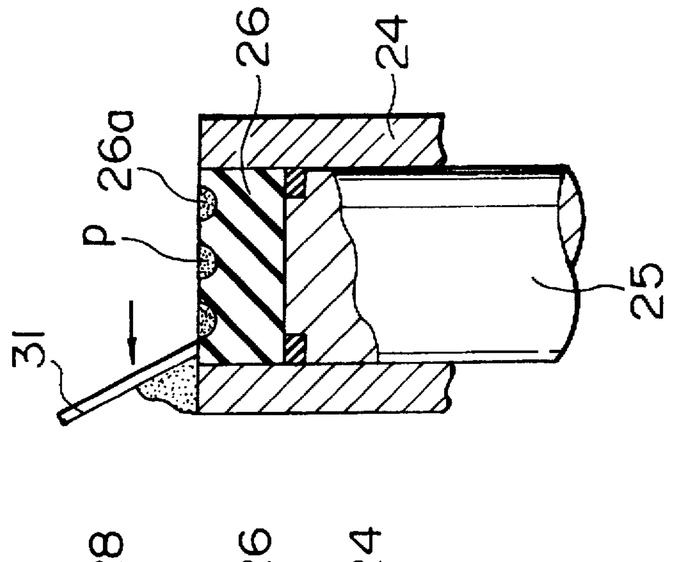
FIGS. 5A, 5B and 5C are a vertical sectional view of an granulation apparatus in which the packing method of the present invention is adopted.
Figure 5B:
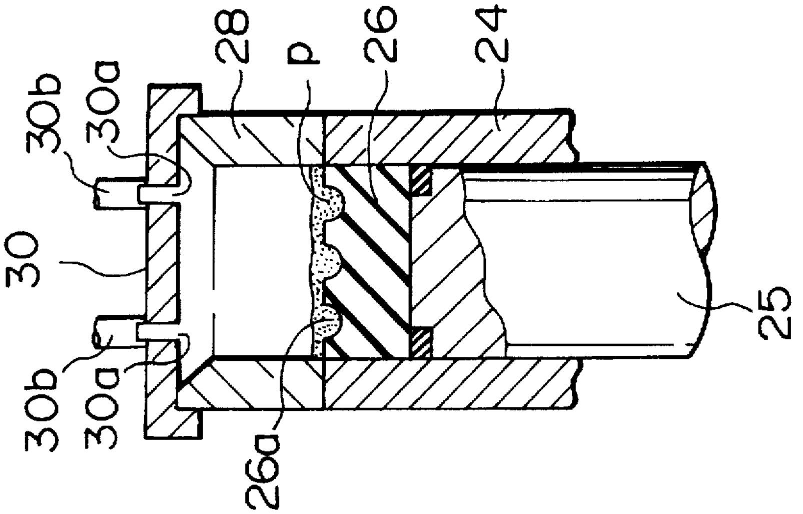
Figure 5A:
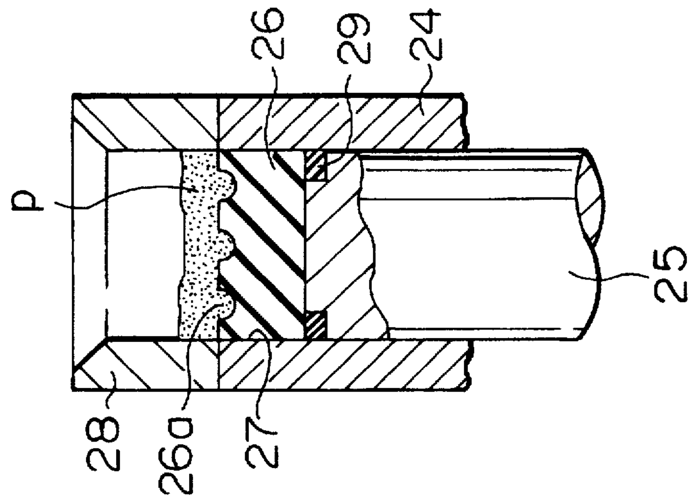

As shown in FIG. 5A, a certain amount of the powder (p) is fed into the guide (28) placed on the upper surface of the die (24). Then, as shown in FIG. 5B, the guide (28) is covered with a cover element (30), the same element as described above referring to FIG. 2 or FIG. 4, so as to form a sealed space above the powder (p) fed into the guide (28). The sealed space is connected with holes (30*a*) which are connected with connecting tubes (30*b*). The air tapping is carried out through the connecting tubes (30*h*) connected to the pumping device so that the powder (p) is packed into the cavities (26*a*).

After the air tapping is repeated several times, as FIG. 5C shows, the guide (28) and the cover element (30) are removed, and leveling is carried out with a spatula (31). Then a upper punch (not shown in the drawing) is placed upon the die (24), and the rubber mold (26) is compressed between the lower punch (25) and the upper punch, thereby granulating the powder (p). In the present embodiment, because the powder (p) is packed into the cavities (26*a*) by means of the air tapping, all the cavities (26*a*) can be filled with the powder (p) evenly and with uniform packing-density, which ensures a rapid granulation with a uniform grain size.

Another embodiment of the present invention adapted for packing a can with dried foods such as dried laver cut, baked thin crackers, corn-flakes, and other flaky materials is hereinafter described referring to FIG. 6.

(32) is a can having an opening (32*a*) upward and a space part (32*b*) to be packed with flaky materials (f), and (33) is a guide placed upon the upper edge of the can (32).

Figure 6B:
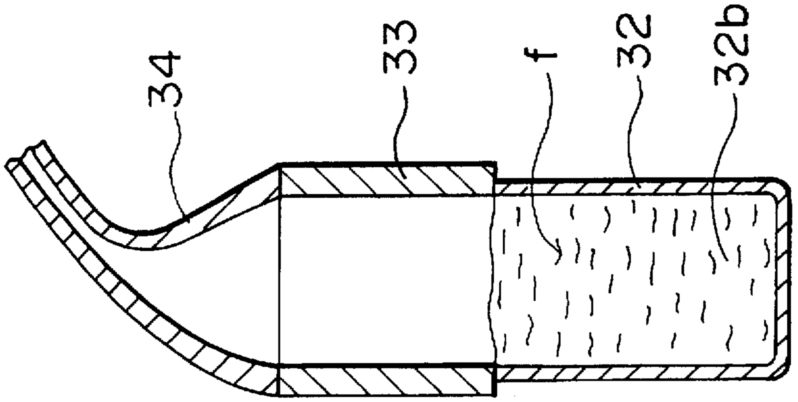
FIGS. 6A and 6B are a vertical sectional view of a packing apparatus for flaky materials in which the packing method of the present invention is adopted.
Figure 6A:
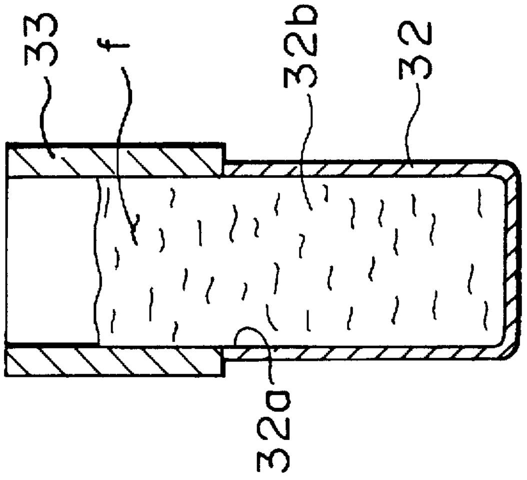

As shown in FIG. 6A, an appropriate amount of flaky materials (f) is fed into the can (32) and to a certain depth of the guide (33) from a feeding device (not shown in the drawing). Then, as FIG. 6B shows, a conical tube (34) whose end is connected to the pumping device is placed upon the upper surface of the guide (33) so as to seal the guide (33) and the space part (32*b*) of the can (32). Then the air tapping as described above is carried out so as to pack all the flaky material into the can (32).

In this embodiment, because the flaky materials (f) is not pressed directly with a device such as a pusher when packed into the can (32), it incurs no damage. In addition, the packing method used in this embodiment does not require a large driving source to apply vibration to the can (32) upon which the guide (33) is placed, it therefore can prevent noise and has an energy-saving effect.

Another embodiment in which the packing method of the present invention is employed for packing a powder or a granular material into a bag such as a soft plastic bag or a paper bag or the like is hereinafter discussed by using FIG. 7. This embodiment is also employed for packing the bag with various materials including the flaky materials described in the above mentiond embodiment.

(35) is a bag-holding container provided with an open top and an appropriate number of holes (35*a*) with which a sucker tube (36) connected to an air sucking source (not shown in the drawing) is connected. (37) is a bag set in the bag-holding container (35). The fringe (37*a*) of the opening of the bag (37) is placed upon the upper surface of the bag-holding container (35). A guide (38) is mounted upon the top surface of the bag-holding container (35). In this embodiment, the opening of the bag (37) corresponds to the opening mentioned in the descriptions above, and the inside of the bag (37) forms the space part to be packed.

Figure 7B:
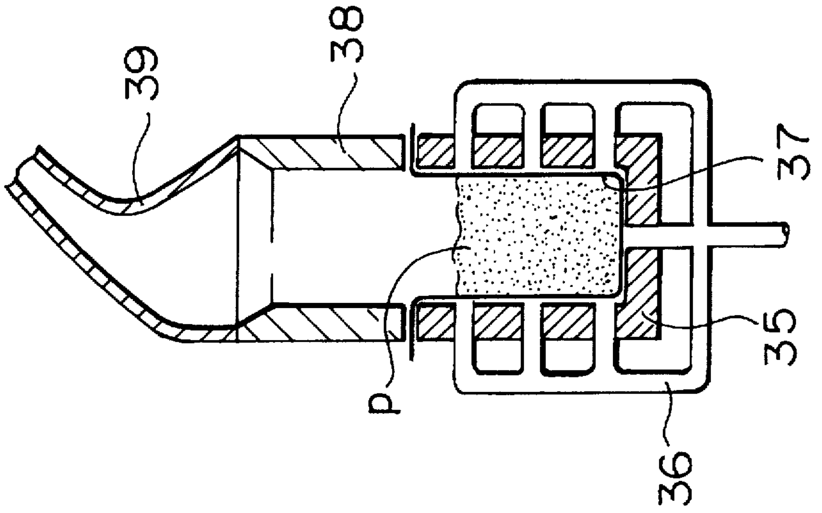
FIGS. 7A and 7B are a vertical sectional view of a packing apparatus for packing materials into a bag in which the packing method of the present invention adopted.
Figure 7A:
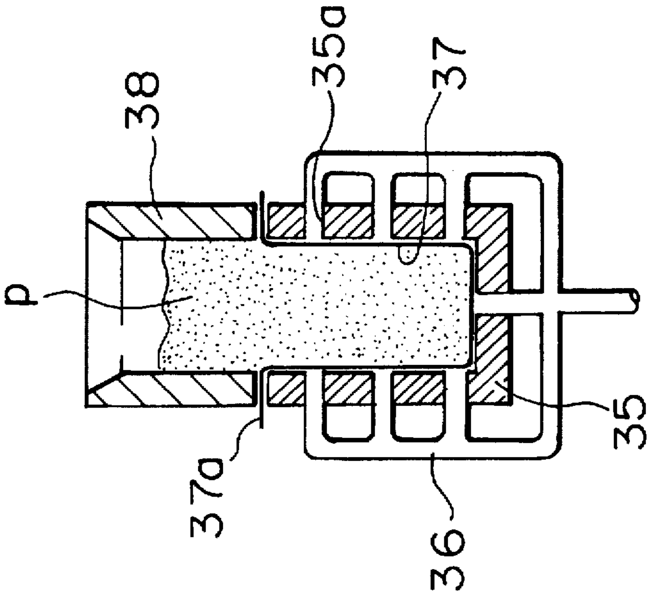

As shown in FIG. 7A, when feeding the powder (p) into the bag (37) set in the bag-holding container (35) from powder feeder (not shown in the drawing), the air sucking source is actuated, so that through the sucker tube (36), it keeps the bag (37) adhering to the inside of the bag-holding container (35). By keeping the bag (37) adhering to the inside of the bag-holding container (35), the bag (37) is sufficiently expanded and its movement is restricted when subjected to the air tapping mentioned later. Then an appropriate amount of the powder (p) is fed into the bag (37) and the guide (38) which is placed on the container (35).

Then as shown in FIG. 7B, the top of the guide (38) is covered with a cone-shaped tube (39) whose end is connected with the pumping device so as to seal the space composed of the bag (37) and the guide (38). Then the air tapping is carried out to fill the bag (37) with the powder (p).

In this embodiment, since the bag-holding container (35) conneted with the sucker tube (36) is not subjected to vibration nor tapping, there is no need for a large power source and thus the durability of the bag-holding container (35) and the like is enhanced. Furthermore, this method effectively prevents the powder (p) from bridging, as well as allows the powder (p) to be packed with a high, uniform density. As a result, the partial deformation due to a low packing-density after scaling the opening of the bag (37*a*) can be prevented.

In the embodiments described so far, the air tapping is carried out after feeding the material into the space part to be packed as well as into the guide so that the material in the guide is packed into the space part. However, it is also possible to feed the material only into a space part to be packed, and then carry out the air tapping so that the material can be packed more compactly and with higher density into the space part. In such a case, the space part to be packed is directly covered with a cover element as shown in FIGS. 2, 4 and 5, or covered with a cone-shaped tube as shown in FIGS. 6 and 7 and then the air tapping is carried out.

Figure 8A:
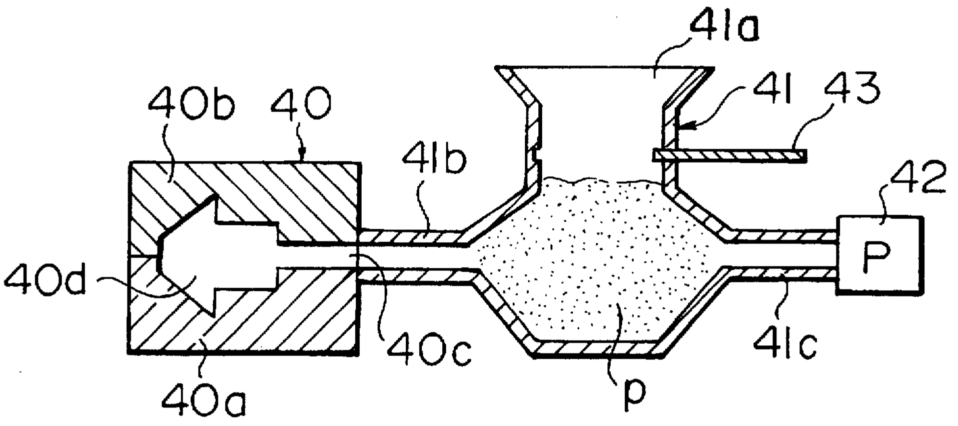
FIGS. 8A, 8B and 8C are a vertical sectional view of a packing apparatus for packing a powder into a split rubber mold in which the packing method of the present is adopted.
Figure 8B:
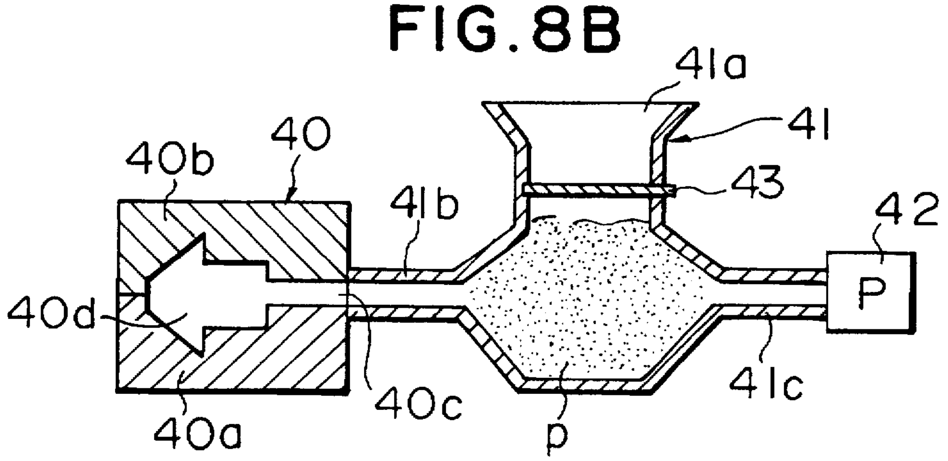
Figure 8C:
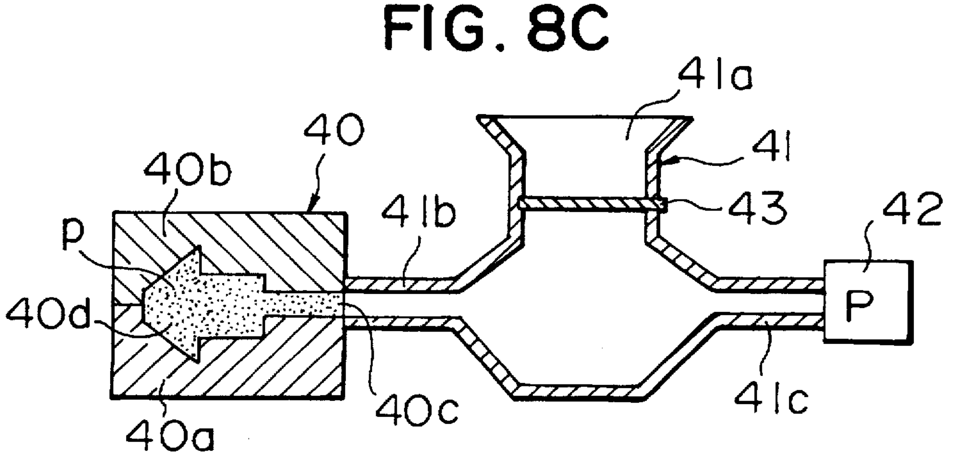

Another embodiment of the present invention is shown in FIG. 8 in which the packing method of the present invention is applied to fill the split rubber mold (40) with a powder (p) with a high packing-density.

In this embodiment, the split rubber mold (40) is separated into two mold elements (40*a*), (40*h*) placed upward and downward, respectively, and an opening (40*c*) from which the powder (p) is injected is formed in the side. The compact produced by using the split rubber mold (40) has a truncated cone-shaped part in its end and to its side with a larger diameter a bold shaft is connected followed by a narrower shaft. (41) is a powder feed tank with a powder entrance (41*a*) above. The powder feed tank (41) is provided with a pipe (41*b*) connected to the opening (40*c*) of the split rubber mold (40), and a pipe (41*c*) connecting the powder feed tank (41) to the pumping device (42) such as an ejector-type vacuum generator.

As FIG. 8A shows, the powder feed tank (41) is fed with the powder (p) from the powder entrance (41*a*). Then, as shown in FIG. 8B, the powder feed tank (41) is closed by a shutter (43) provided below the powder entrance (41*a*). Thus, the space part (40*d*) of the split rubber mold (40) which space corresponding to the shape of the aimed compact and the inner space of the powder feed tank (41) closed with the shutter (43) form a sealed space. Subsequently, the pumping device (42) such as an ejector-type vacuum generator is actuated so that said sealed space formed by the space part (40*d*) of the split die (40) and the space inside the powder feed tank (41) closed with the shutter (43) is alternately switched from the low air-pressure state to the high air-pressure state, which process is repeated an appropriate times. The powder (p) is therefore packed into the space part (40*d*) of the split rubber mold (40).

FIG. 8 shows an embodiment in which one split rubber mold (40) is connected to the powder feed tank (41) through one pipe (41*b*). However, it is also possible to fill a plurality of split rubber molds with powder at the same time with a high packing-density by connecting the plurality of the split rubber molds (40) to the powder feed tank (41) through a plurality of the pipes (41*b*).

After the powder (p) is packed into the space part (40*d*) of the split rubber mold (40) at a high packing-density by the air tapping, the split rubber mold (40) filled with the powder (p) is removed from the pipe (41*b*) of the powder feeding tank (41), and then the whole body of the split rubber mold (40) filled with the powder (p) is covered with a rubber sheet and subjected to vacuum sealing. Subsequently, the vacuum-sealed split rubber mold (40) is dipped into a pressure vessel of the wet hydrostatic press apparatus, and then liquid pressure is applied to the pressure vessel to apply a pressure to the split rubber mold (40) from outside, thereby compacting the powder (p) packed into the split rubber mold (40) to obtain a powder compact. After the split rubber mold (40) is ejected from the pressure vessel, the rubber sheet is removed and the split rubber mold (40) is separated into the mold elements (40*a*), (40*b*) to take the compact out. The compact produced through the steps above is subjected to sintering or the like and becomes a hard, strong product of powder metallurgy.

The air tapping of the present invention ensures high-density packing of the powder (p) into the space part (40*d*) of the split rubber mold (40) shown in FIG. 8, even when the opening (40*c*) is provided in the side of the split rubber mold (40), or when the opening (40*c*) is narrow.

In the above embodiment, the split rubber mold (40) is filled with the powder (p). Instead of the split rubber mold (40), other containers such as bottles and cans can be effectively filled with the powder by the method of the present invention. In addition, it is also possible for the method of the present invention to pack a plurality of containers with powder at the same time, with the containers provided radially around the powder feeding tank (41). Therefore, tha packing can be carried out very efficiently.

Figure 9:
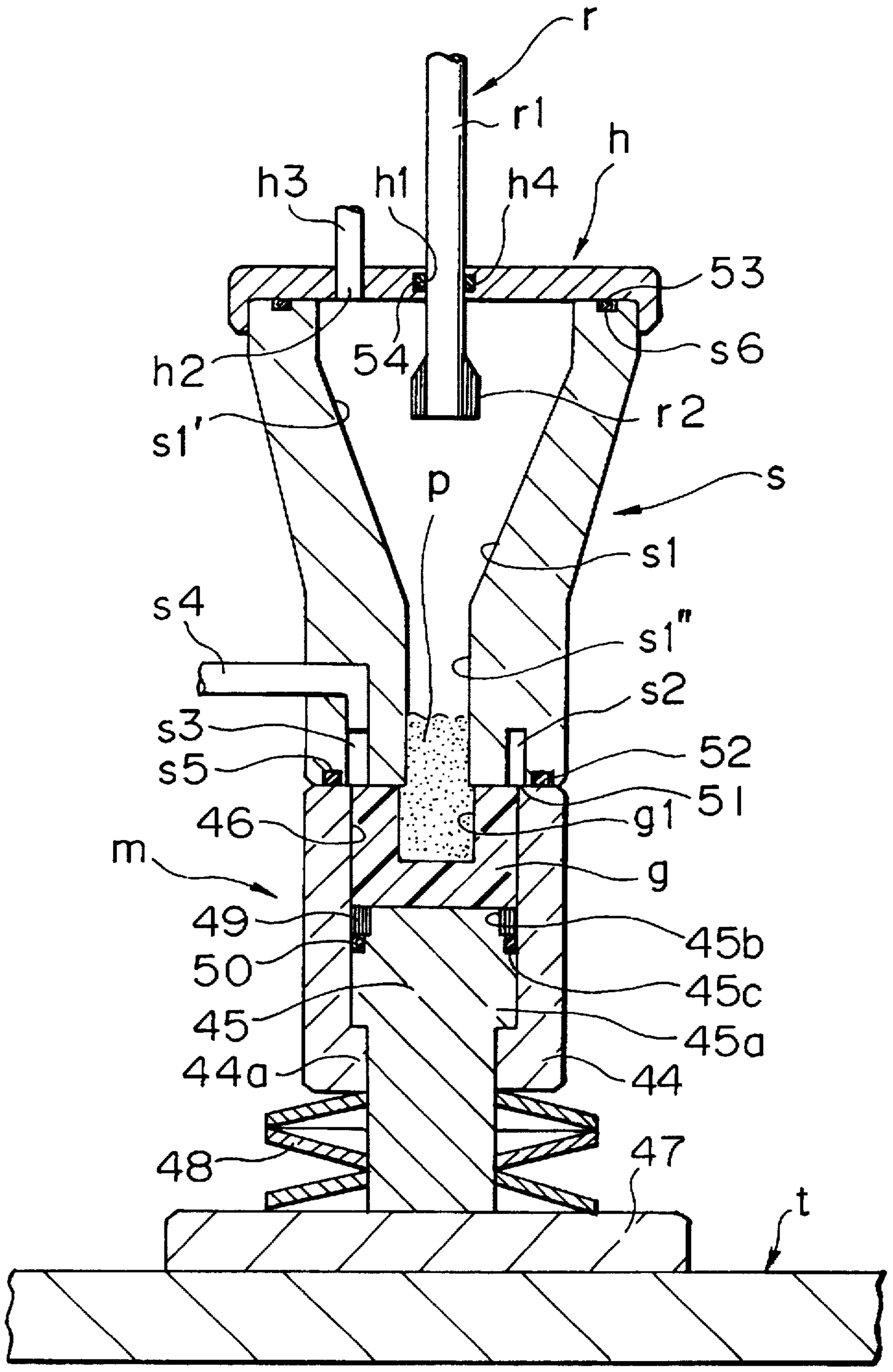
FIG. 9 is a vertical sectional view of a packing apparatus having a mold device in which the packing method of the present invention is adopted.

Other embodiment in which the packing method of the present invention is adopted in a powder packing apparatus is hereinafter discussed using FIGS. 9 to 11.

A rubber mold (g) is loaded into a cavity (46) formed by a cylindrical die (44) and a lower punch (45) inserted into said die (44). The rubber mold (g) is provided with a recess (g1) which is shaped according to the desired shape of the compact to be produced. (t) is a frame or a turntable of the apparatus to which the lower punch (45) is fixed by means of bolts or other appropriate fixing means through a support plate (47). Between the lower surface of the die (44) and the upper surface of the support plate (47), an appropriate number of flat springs (48) are provided surrounding the lower punch (45). It is preferable to design the lower punch (45) to have a upper part (45*a*) with a large diameter as well as to inwardly form a flange (44*a*) in the lower end of the die (44) so that the bottom surface of the upper part (45*a*) with a large diameter and the top surface of the flange (44*a*) are contacted, thereby restricting the upward movement of tle die (44).

(49) is a back-up ring made from hard synthetic rubber and the like which is fit to an annular recess (45*b*) formed in the upper end of the lower punch (45). The function of the back-up ring (49) is to prevent the rubber mold (g) from getting caught by the clearance between the die (44) and the lower punch (45). (50) is a sealing element fit into an annular groove (45*c*) provided under the annular recess (45*b*) of the lower punch (45). The sealing element (50) is made from rubber softer than that used for the back-up ring (49) and has a similar effect as O-rings which are frequently used in vacuum machines, that is, to stop the flow of air between the die (44) and the lower punch (45).

A mold device (m) comprises the above mentioned die (44), the lower punch (45) inserted into the die (44), the support plate (47) and the flat springs (48) and so forth.

(s) is a guide having a vertical hole (s1). In order to facilitate feeding powder into the guide (s), the upper part of the hole (s1) should preferably form a slope (s1') inclined outwardly toward the upper end. (s2) represents an air chamber having an opening which is provided in the lower part of the guide (s) and around the hole (s1). The air chamber (s2) is formed along a contact line (51) at which the rubber mold (g) loaded in the cavity (46) and the die (44) contact with each other so that the said air chamber (s2) covers the contact line (51). (s3) is a interconnecting hole which leads to the air chamber (s2) and has an opning in the side of the packing guide (s). To the interconnecting hole (s3), a sucker pipe (s4) connected with an air sucking source (not shown in the drawing) is connected through an appropriate connecting tube.

(52) is a sealing element which is fit to the groove (s5) formed in the bottom of the guide (s) and provided outside of the air chamber (s2), contacting the top surface of the die (44). (53) is a sealing element fit to a groove (s6) formed in the upper surface of the guide (s).

(h) is a cover element which covers the guide (s) at whose central part, a hole (h1) is provided. The covrer element (h) is provided with a hole (h2) which is connected with a connecting pipe (h3) leading to the pumping device such as an ejector-type vacuum generator (not shown in the drawings). (r) is a pusher which has a pressing part (r2) in the end of the rod (r1). The pressing part (r2) is designed to fit into a columnar space (s1") of the hole (s1) of the guide (s). The rod (r1) is inserted into the hole (h1) provided at around the central part of the cover element (h), and to a groove (h4) formed along the hole (h1), a sealing element (54) is fit so as to keep hermetic contact of the cover element (h) and the rod (r1). Meanwhile, as mentioned later, when the powder (p) packed into the rubber mold (g) and to a certain depth of the guide (s) can be totally packed into the recess (g1) of the rubber mold (g) at a high packing-density by the air tapping process, the pusher (r) mentioned above is ommitted.

Figure 10A:
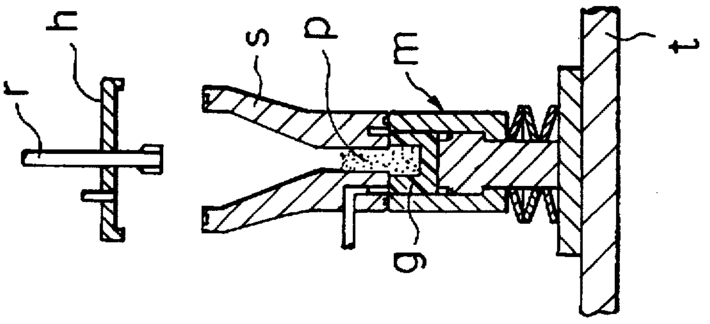
FIGS. 10A, 10B, 10C and 10D are the packing process of the packing apparatus shown in FIG. 9.
Figure 10B:
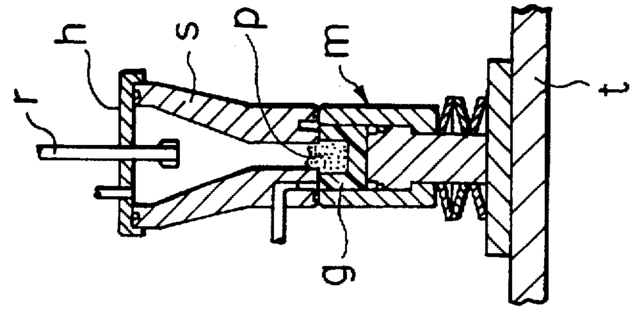
Figure 10C:
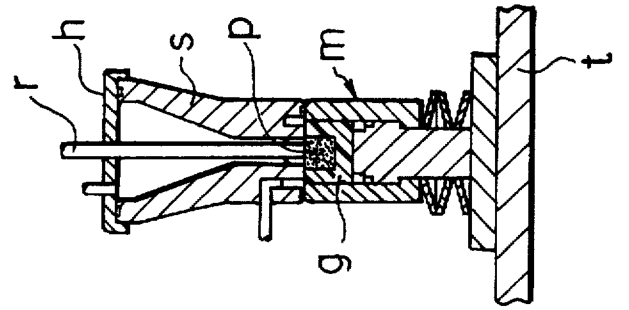
Figure 10D:
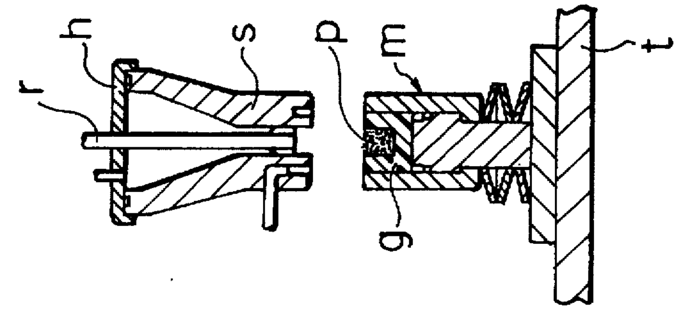
Figure 11:
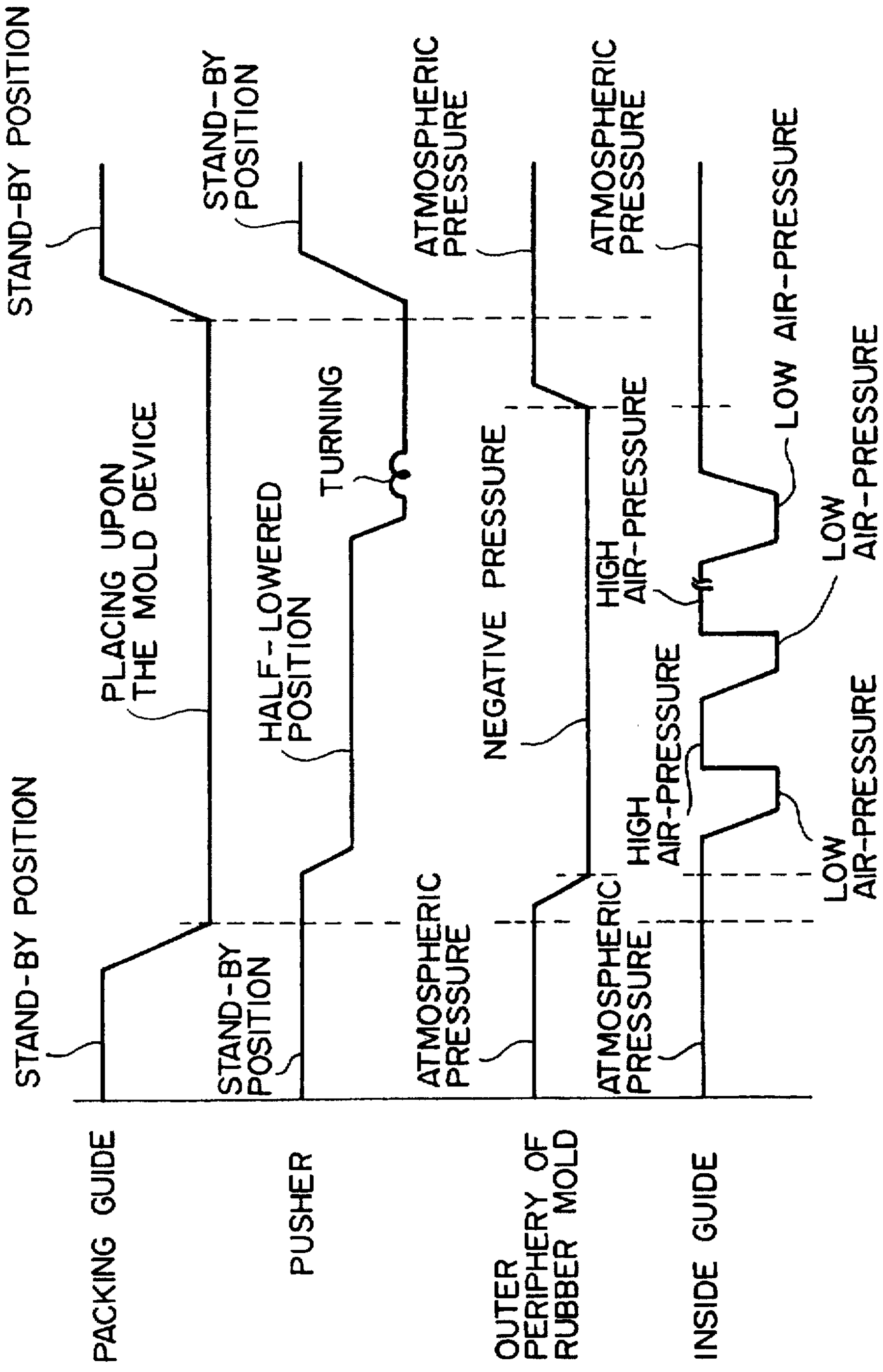
FIG. 11 is an operational diagram showing relatively the movements of the main parts of the packing apparatus shown in FIGS. 10 and 11.

Referring to FIGS. 10 and 11, the process of packing powder into the recess g1 of the rubber mold g is now explained.

Prior to the powder packing process, the guide (s) in the stand-by position above the mold device (m) is lowerd and placed upon the top surface of the die (44) with its cavity (46) loaded with the rubber mold (g) so that the air chamber (s2) covers the contact line (51) at which the rubber mold (g) and the die (44) contact with each other. In this stage, because the sealing element (52) is pressed upon the top surface of the die (44), the top surface of the die (44) and the bottom of the guide (s) hermetically contact with each other. The cover element (h) with the pusher (p) inserted into the hole (h1) is located at the stand-by position above the mold device (m) and the guide (s) mounted upon the mold device (m). With this condition, the weighed powder (p) is supplied into the recess (g1) of the rubber mold (g) and into the guide (s) to a certain depth of the columnar space (s1") of the guide (s).

Before or after the powder (p) supplied into the rubber mold (g) and guide (s), an air sucking source (not shown in the drawing) is actuated, and through the sucker pipe (s4) and the interconnecting hole (s3), the pressure in the air chamber (s2) which is provided to cover the contact line (51) of the rubber mold (g) and the die (44) is reduced to a negative pressure, by which the clearance existing in the area at which the rubber mold (g) contacts with the die (44) is subjected to negative pressure. The negative pressure of the clearance makes the rubber mold (g) closely fit and fixed to the inside of the die (44), which prevents the rubber mold (g) from distortion or vibration while the inside of the guide (s) and the rubber mold (g) are brought into the low air-pressure state and the high air-pressure state alternately, namely, are subjected by the air tapping process.

When the thickness of the rubber mold (g) is small or the material rubber is soft, repetition of switching the inside air-pressure of the guide (s) and the rubber mold (g) from a low air-pressure state to a high air-pressure state, that is, repetition of the air tapping, causes trouble such as distortion or vibration of the rubber mold (g) which impedes powder packing with a uniform packing-density. Therefore, as discussed above, it is important to evacuate the air remaining between the rubber mold (g) and die (44) and to subject the outer circumference of the rubber mold (g) to a negative pressure so as to firmly fix the rubber mold (g). Of course, when the thickness of the rubber mold (g) is large or the material rubber is hard and thus the rubber mold (g) will not deform or vibrate even if the inside of the guide (s) and the rubber mold (g) are repeatedly subjected to switching from the low air-pressure state to the high air-pressure state, it is not necessary to subject the outer circumference of the rubber mold (g) to a negative pressure.

Due to the sealing element (50) fit to the annular groove (45*c*) formed below the annular recess (45*b*) of the lower punch (45), the flow of air from the contacting surfaces of the die (44) and the lower punch (45) into the cavity (46) is shut out.

Subsequently, as FIG. 10B shows, the cover element (h) at the stand-by position above the guide (s) mounted on the mold device (m) is lowered with the pusher (r) inserted into the hole (h1) so that the guide (s) is covered with the cover element (h). As mentioned above, because the sealing element (53) is fit to the groove (s6) formed in the top surface of the guide (s), the inside of the guide (s) can be held hermetic with the cover element (h).

When the pressing part (r2) of the pusher (r) inserted into the hole (h1) of the cover element (h) mounted on the guide (s) is positioned at upper part of the guide (s) (this position of the pusher (r) is hereinafter referred to as the "half lowered position"), the pumping device (not shown in the drawings) is actuated so that through the connecting pipe (h3), the pressure in the guide (s) and the rubber mold (g) are reduced to the low air-pressure state. Such a low air-pressure state inside the guide (s) and the rubber mold (g) evacuates the air contained in the powder.

Then, by stopping the air sucking or introducing air, the inside of the guide (s) and the rubber mold (g) is rapidly returned to the high air-pressure state, when the density of the powder (p) packed is raised. After further some time, the pumping device is actuated again so as to reduce the pressure inside the guide (s) and the rubber mold (g) to the low air-pressure. By repeating such air tapping switching from the low air-pressure state to the high air-pressure state, the air contained in the powder (p) is evacuated as well as voids generated in the powder (p) due to bridging among the powder particles and voids remaining between the powder (p) and the rubber mold (g) are removed, thereby increasing the density of the powder in the rubber mold (g). By rapidly repeating the air tapping, the powder (p) is packed into the recess (g1) of the rubber mold (g) with a high packing-density fast and efficiently.

In the air tapping process, it is preferable to introduce air into the guide (s) and the rubber mold (g) more rapidly than when evacuating air in the guide (s) and the rubber mold (g).

The powder is therefore packed at a high density more efficiently owing that the flow speed of air is larger when the air is introduced than it is evacuated.

If the whole powder (p) packed in the rubber mold (g) and in the guide (s) to a certain depth of the packing guide (s) is not thoroughly packed into the recess (g1) of the rubber mold (g), the pusher (r) is lowered as shown in FIG. 10C and with the pressing part (r2), the powder (p) remaining in the space s1" of the guide (s) is totally pressed into the recess (g1) of the rubber mold (g) at a high packing-density.

When the recess (g1) of the rubber mold (g) is deep, it is preferable to reduce again the pressure inside the guide (s) to be the low air-pressure state before lowering the pusher (r). When the recess (g1) of the rubber mold (g) is shallow, the pusher (r) may be lowered while the inside of the guide (s) is kept at atmospheric pressure. Subsequently, with the bottom of the pressing part (r2) contacting the powder (p) packed into the recess (g1) of the rubber mold (g) at a high density, the pusher (r) is rotated a certain angle or several times around the axis of the pusher (r). Rotating the pusher (r) with its bottom contacting the powder (p) packed at a high density prevents the powder (p) from sticking to the bottom of the pressing part (r2). This turning process may be omitted when the powder (p) has small adherence.

As described above, by the repitition of the air tapping, the powder (p) fed into the rubber mold (g) and the guide (s) is packed into the recess (g1) of the rubber mold (g) with a high packing-density. When using a certain kind of powders or when the recess (g1) of the rubber mold (g) is shallow, the whole powder (p) fed into the rubber mold (g) and a certain depth of the guide (s) can be packed into the recess (g1) of the rubber mold (g) only by the air tapping process. In such cases, the pressing process with the pusher (r) is omitted.

In addition, because the repetition of the air tapping allows most of the powder (p) fed into the rubber mold (g) and to a certain depth of the guide (s) to be packed into the recess (g1) of the rubber mold (g), the descending distance of the pusher (r) for pressing the powder (p) into the recess (g1) of the rubber mold (g) can be short. Owing to such a short descending distance of the pusher (r), the packing-density can be high and uniform because it dose not vary depending on the region near the pusher (r) or away from the pusher (r).

After the high-density packing of the powder (p) into the rubber mold (g) with the pressing part (r2) is completed, and after or while the pusher (r) is rotated the pumping device connected with the connecting pipe (h3) is stopped so that the inside of the guide (s) and the rubber mold (g) is returned to the atmospheric pressure state. Until this state, the air chamber (s2) is still kept to be the negative pressure state.

After the process above, the pressing part (r2) of the pusher (r) is put away from the surface of the packed powder (p) with a high density by lifting the pusher (r) before removing the cover element (h) from the guide (s), or lifting the pusher (r) together with the cover element (h).

Subsequently, as shown in FIG. 10D, the guide (s) is raised to be separated from the mold device (m). However, prior to the lifting of the guide (s), the air sucking source connected with the sucker pipe (s4) is stopped so as to return the state of the air chamber (s2) to the atmospheric pressure. The series of high-density packing of the powder (p) into the rubber mold (g) is thus completed. If the air chamber (s2) is in a negative pressure state when the guide (s) is raised, a trouble that the rubber mold (g) is raised while being attached to the guide (s) my occur.

As described above, after the powder (p) fed into the rubber mold (g) and the guide (s) is packed into the rubber mold (g) at a high packing-density, the inside state of the guide (s) is returned to atmospheric pressure, and then the air chamber (s2) is returned to the atmospheric pressure. The reason of this order is that if the air chamber (s2) is first returned to the atmospheric pressure, and then the guide (s) is returned to the atmospheric pressure, the powder (p) packed at a high density may flow over the rubber mold (g) due to contraction of said rubber mold (g).

It is also possible to raise the guide (s) together with or after ascending of the cover element (h) while the pressing part (r2) is kept placed upon the packed powder (p). In this case, the pusher (r) functions as a guiding device for the guide (s), which therefore prevents the guide (s) from swinging sideward and touching the rubber mold (g) or the powder (p) packed at a high density.

In the production of the rare earth magnets, the pressing should preferably carried out in a nitrogen atmosphere in order to prevent oxdation. In such a case, the above mentioned wordings such as evacuate, low air-pressure, high air-pressure, introduction of air are all related to the nitrogen gas, that is, the gas introduced and the gas whose pressure is switched from a low air-pressure state to a high air-pressure state in the nitrogen gas. Argon or helium gas may also be used.

After completion of the high-density packing of the powder (p) into the rubber mold (g), the pusher (r), the cover element (h) and the guide (s) are raised off the mold device (m) to be returned to the stand-by position. And then the mold device (m) is transferred to the following stage at which the pressing with punches or orientation of the powder by magnetic field application is carried out.

The effects of the present invention are stated as follows.

Because the material is packed into the space part to be packed by the air tapping, the packing-density of the material can be uniform.

By employing such an air tapping, the material does not incur any damage and can be packed promptly at a high density.

Bridges generated in the material can be efficiently removed while preventing any damage to the material.

The material can rapidly and throughly fill the space part to the corners at a uniform packing-density even if the space part has a complicated, three-dimentional shape, or has a oblong side part, or has a deep and narrow shape.

A preliminarily, precisely weighed material can entirely be packed into the space part to be packed and therefore the quantity of the material can be kept constant which prevents fluctuation of the products in weight, in quantity and in size.

By employing the air tapping, the guide, the core or the like can be short and therefore the apparatus can be downsized which leads to a high operational and a working performance.

There is no need to apply vibration or tapping to the devices such as the pressure vessel, the mold device, the guide and the die etc.. Accordingly, the present invention enhances the durability of the apparatus, soundproofing performances as well as energy saving performance.

By employing the air tapping, the powder fed into the rubber mold and the guide can be packed at a uniform, high density all over the rubber mold.

By employing the air tapping, the air contained in the powder can be efficiently ejected.

Because the air tapping allows most of the powder, which has been fed into the rubber mold and in the guide up to a certain depth of the guide, to be packed into the rubber mold, the descending distance of the pusher for pressing the powder into the rubber mold can be short. Owing to such a short descending distance of the pusher, the packing-density can be high and uniform because it dose not vary depending on the region near the pusher or away from the pusher.

Since the outer circumference of the rubber mold is subject to a negative pressure, the rubber mold can be firmly fixed to the die and therefore, distortion or vibration of the rubber mold due to the air tapping can be prevented as well as unevenness of the packing-density of the powder accompanying the distortion of the rubber mold can be prevented.

Because the pressure state inside the guide is returned to the atmospheric pressure and subsequently the outer circumference of the rubber mold is returned to be subject to the atmospheric pressure, the rubber mold does not contract, thus preventing the powder from flowing over the rubber mold.

We claim:

1. A packing method comprising the steps of:

supplying a material into a space comprising a space part to be packed with the material and a space connecting with the space part; and subjecting the space supplied with the material to an air tapping process at least once in which the air-pressure inside the space is switched from a low air-pressure state to a high air-pressure state alternately, thereby packing the material into the space part at a high packing-density.

2. A packing method according to claim 1, in which the space connecting with the space part to be packed with the material comprises a guide.

3. A packing method according to claim 1 or claim 2, in which the flow speed of air is higher when bringing the inside air-pressure of the space into a high air-pressure state than when bringing the inside air-pressure of the space to a low air-pressure state.

4. The packing method of claim 1 or 2, in which the space part to be packed with the material is a space formed in a die.

5. The packing method of claim 1 or 2, in which the space part to be packed with the material is a space formed in a rubber mold.

6. The packing method of claim 1 or 2, in which the space part to be packed with the material is a container.

7. The packing method of claim 3, in which the space part to be packed with the material is a space formed in a die.

8. The packing method of claim 3, in which the space part to be packed with the material is a space formed in a rubber mold.

9. The packing method of claim 3, in which the space part to be packed with the material is a space formed in a container.

10. A packing method comprising the steps of:

placing a guide upon a mold device loaded with a rubber mold;

supplying a powder into the guide and the rubber mold; and applying an air tapping process at least once in which the air-pressure inside the guide and the rubber mold is switched from a low air-pressure state to a high air-pressure state alternately, thereby, packing the powder supplied into the guide and the rubber mold into the rubber mold at a high packing-density.

11. A packing method according to claim 10, further comprising the step of pressing with a pusher following the air tapping process.

12. A packing method according to claim 10 or claim 11, in which the outer periphery of the rubber mold is subjected to a negative pressure.

13. A packing method according to claim 12, in which after the powder is packed into the rubber mold at a high packing-density, the air-pressure inside the guide is returned to the atmospheric air-pressure and subsequently the air-pressure applied to the outer periphery of the rubber mold is returned to the atmospheric air-pressure.

14. The packing method of claim 10, in which the flow speed of air is higher when bringing the inside air-pressure of the guide and the rubber mold into a high air-pressure state than when bringing the inside air-pressure of the guide and the rubber mold into a low air-pressure state.

15. The packing method of claim 11, in which the flow speed of air is higher when bringing the inside air-pressure of the guide and the rubber mold into a high air-pressure state than when bringing the inside air-pressure of the guide and the rubber mold into a low air-pressure state.

16. The packing method of claim 12, in which the flow speed of air is higher when bringing the inside air-pressure of the guide and the rubber mold into a high air-pressure state than when bringing the inside air-pressure of the guide and the rubber mold into a low air-pressure state.

17. The packing method of claim 13, in which the flow speed of air is higher when bringing the inside air-pressure of the guide and the rubber mold into a high air-pressure state than when bringing the inside air-pressure of the guide and the rubber mold into a low air-pressure state.

18. A packing method comprising the steps of:

placing a guide upon a mold device loaded with a rubber mold;

supplying a powder into the guide and the rubber mold;

evacuating air in the interface region at which a die and the rubber mold contact with each other;

covering the guide with a cover element; and applying an air tapping process at least once in which the air-pressure inside the guide and the rubber mold is switched from a low air-pressure state to a high air-pressure state alternately, thereby packing the said powder into the rubber mold at a high packing-density.

19. The packing method of claim 18, in which the flow speed of air is higher when bringing the inside air-pressure of the guide and the rubber mold into a high air-pressure state than when bringing the inside air-pressure of the guide and the rubber mold into a low air-pressure state.

20. A packing method comprising the steps of:

placing a guide upon a mold device loaded with a rubber mold;

supplying a powder into the guide and the rubber mold;

evacuating air in the interface region at which a die and the rubber mold contact with each other;

covering the guide with a cover element;

applying an air tapping process at least once in which the air-pressure inside the guide and the rubber mold is switched from a low air-pressure state to a high air-pressure state alternately; and pressing the powder with a pusher, thereby packing the said powder into the rubber mold at a high packing-density.

21. The packing method of claim 12, in which the flow speed of air is higher when bringing the inside air-pressure of the guide and the rubber mold into a high air-pressure state than when bringing the inside air-pressure of the guide and the rubber mold into a low air-pressure state.

* * * * *